United States Patent
Curry et al.

(10) Patent No.: US 9,088,558 B2
(45) Date of Patent: Jul. 21, 2015

(54) SECURE ONE-WAY INTERFACE FOR OPC DATA TRANSFER

(71) Applicant: Owl Computing Technologies, Inc., Ridgefield, CT (US)

(72) Inventors: John Curry, New River, AZ (US); Ronald Mraz, South Salem, NY (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 87 days.

(21) Appl. No.: 13/972,130

(22) Filed: Aug. 21, 2013

(65) Prior Publication Data

US 2015/0058925 A1 Feb. 26, 2015

(51) Int. Cl.
*H04L 29/06* (2006.01)

(52) U.S. Cl.
CPC ...................................... *H04L 63/08* (2013.01)

(58) Field of Classification Search
CPC ....................................................... H04L 63/08
See application file for complete search history.

(56) References Cited

U.S. PATENT DOCUMENTS

| | | | |
|---|---|---|---|
| 5,703,562 A | 12/1997 | Nilsen | |
| 6,411,987 B1 | 6/2002 | Steger et al. | |
| 7,003,558 B2 | 2/2006 | Agrusa et al. | |
| 7,073,182 B1 * | 7/2006 | Osburn, III | 719/328 |
| 7,496,668 B2 | 2/2009 | Hawkinson et al. | |
| 8,234,384 B2 | 7/2012 | Fisher et al. | |
| 8,352,450 B1 | 1/2013 | Mraz | |
| 2006/0056285 A1 | 3/2006 | Krajewski, II et al. | |
| 2008/0040790 A1 * | 2/2008 | Kuo | 726/12 |
| 2010/0325244 A1 | 12/2010 | Lucas et al. | |

OTHER PUBLICATIONS

Waterfall for OPC-DA, Brochure, Oct. 2010.

* cited by examiner

*Primary Examiner* — Justin T Darrow
(74) *Attorney, Agent, or Firm* — John S. Economou

(57) ABSTRACT

A system for transmitting OPC information from a first network in a first security domain to a second network in a second security domain. A first stand-alone server within the first security domain retrieves information via the first network from a first OPC server in the first security domain and forwards the retrieved information to a send server coupled to the first network. The send server forwards the received information received to a receive server via a one-way data link. The receive server receives the information from the send server and forwards the received information to a second stand-alone server via the second network. The second stand-alone server receives the information from the receive server and forwards the information to one or more OPC clients in the second security domain.

12 Claims, 5 Drawing Sheets

SECURE ONE-WAY INTERFACE FOR OPC DATA TRANSFER

FIELD OF INVENTION

This invention relates generally to a secure one-way data interface for transferring OPC data from a first network in a first security network domain to a second network in a second security network domain.

BACKGROUND OF THE INVENTION

Manufacturing processes and associated industrial process control systems produce a large amount of process information, and software applications are available that provide access in real-time to such information via network connections. Various communication protocols have been used to manage the information flow between networked equipment comprising the process control system. One particular standard is OPC (originally "Object Linking and Embedding for Process Control" and now "Open Platform Communications"), defined and maintained by the OPC Foundation. OPC was originally designed for use by programmers in building programs and systems that allow communication in a Distributed Component Object Model ("DCOM") system, such as a network of computers, in which component objects can reside on different computers. DCOM is a proprietary Microsoft protocol for communication among software components distributed across networked computers. OPC Unified Architecture ("OPC UA") is a newer version of the OPC standard which does not rely upon DCOM for communications. OPC provides a distributed client-server architecture for communications within the process control system.

OPC allows automation systems to share information and interoperate with other industrial automation, process control, and other business systems for plants or factories. The OPC standard is a non-proprietary technical specification that is maintained by the OPC Foundation. By providing a framework for a common interface, OPC eliminates the need to write a custom interface (or server/driver) to exchange data with hardware field devices for each product. OPC defines a standard set of interfaces, properties, and methods for use in process control, manufacturing, and automation applications. These applications may include distributed control systems, programmable logic controllers, input/output (IO) systems, smart field devices, and other servers of real-time information. OPC can provide office applications with plant floor data via local area networks (LANs), remote sites, or the Internet.

In many situations, the process control network is located within a secure area, while client applications run on computers coupled to a separate corporate business network that are (or should be) isolated from that secure area. Coupling the separate corporate business network directly to the process control network, without security precautions, can lead to significant security issues, and even a firewall used to couple the two networks can be compromised. OPC does not, however, address how to securely transfer information from a secure process control network to a separate corporate business network.

Alternative network security methods and devices based on unidirectional data transfer have been devised to address the network security concern. For example, U.S. Pat. No. 5,703,562 to Nilsen ("the '562 Patent"), the contents of which are hereby incorporated by reference in its entirety, provides an alternative way to address the network security concern. The '562 Patent discloses a method of transferring data from an unsecured computer to a secured computer over a one-way optical data link comprising an optical transmitter on the sending side and an optical receiver on the receiving side. By providing such an inherently unidirectional data link to a computer/data network to be protected, one can eliminate any possibility of unintended data leakage out of the computer/data network over the same link.

Any data link that strictly enforces the unidirectionality of data flow is called a one-way link or one-way data link. In other words, it is physically impossible to send information or data of any kind through a one-way data link in the reverse direction. A one-way data link may be hardware-based, software-based, or based on some combination of hardware and software.

One-way data transfer systems based on such one-way data links provide network security to data networks by isolating the networks from potential security breaches (i.e., undesired and unauthorized data flow out of the secure network) while still allowing them to import data from the external source in a controlled fashion. FIG. 1 schematically illustrates an example of one such one-way data transfer system 100. In the one-way data transfer system shown in FIG. 1, two computing platforms 101 and 102 (respectively, "the send platform" and "the receive platform") are connected to the unsecured external network 104 ("the source network") and the secure network 105 ("the destination network"), respectively. The send platform 101 is connected to the receive platform 102 by a one-way data link 103, which may be an optical link comprising, for example, a high-bandwidth optical fiber. This one-way optical data link 103 may be configured to operate as a unidirectional data gateway from the source network 104 to the secure destination network 105 by having its ends connected to an optical transmitter on the send platform and to an optical receiver on the receive platform.

A configuration such as the one shown in FIG. 1 physically enforces one-way data transfer at both ends of the optical fiber connecting the send platform 101 to the receive platform 102, thereby creating a truly unidirectional data transfer link between the source network 104 and the destination network 105. One-way data transfer systems based on a one-way data link are designed to transfer data or information in only one direction, making it physically impossible to transfer any kind of data, such as handshaking protocols, error messages, or busy signals, in the reverse direction. Such physically imposed unidirectionality in data flow cannot be hacked by a programmer, as is often done with firewalls, where unidirectional rules are software-protected (e.g., password authentication, etc.). Accordingly, the one-way data transfer system based on a one-way data link ensures that data residing on the isolated destination secure computer or network is maximally protected from any undesired and unauthorized disclosure. Alternatively, the source network is isolated from any malware contained in the destination network.

As described in U.S. Pat. No. 8,352,450, issued on Jan. 8, 2013, the contents of which are incorporated herein by reference, files or data packets based on various conventional transport protocols may be transferred across a one-way data link under suitable arrangements. For example, files or data packets may be transferred across a one-way link based on the Transmission Control Protocol (TCP). FIG. 2 is a functional block diagram that schematically illustrates implementation of a TCP-based secure file (or data packet) transfer across a single one-way data link in a one-way data transfer system 200.

Construction of the conventional TCP sockets requires bilateral communications since it requires an acknowledgement channel from the receive node to the send node. Accordingly, the conventional TCP/IP protocol cannot be implemented directly in a one-way data transfer system based on a one-way data link, since no bilateral "hand shaking" is allowed over the one-way link due to physical enforcement of unidirectionality of data flow. Instead, the one-way data transfer system 200 illustrated in FIG. 2 uses a TCP simulation application called TCP proxy, which is preferably a TCP/IP socket-based proxy software, but may also be hardware-based or based on a suitable combination of software and hardware, to simulate the TCP/IP protocol across the one-way data link 207.

In FIG. 2, a TCP server proxy 205 fully implements the TCP/IP protocol in its bilateral communications 203 with the upstream TCP file client 202 residing in a source platform 201. The TCP server proxy 205 may reside within the send node 204 as shown in FIG. 2, or alternatively, may be separate from but coupled to the send node 204. After the TCP server proxy 205 receives files or data packets from the TCP file client 202, the send node 204 sends the files or data packets through its interface 206 to the one-way data link 207. After the receive node 208 receives the files or data packets through its interface 209 from the one-way data link 207, the TCP client proxy 210 communicates under the full implementation of the TCP/IP protocol with a TCP file server 213 residing in a destination platform 212 and forwards the received files or data packets to the TCP file server 213. The TCP client proxy 210 may reside within the receive node 208 as shown in FIG. 2, or alternatively, may be separate from but coupled to the receive node 208.

In certain situations, it would be advantageous to use a one-way data link with an independent link layer protocol for one-way transfer so that non-routable point to point communications with a true IP protocol break can be enforced. With these properties, data packets or files cannot be accidentally routed in the network and other protocols (such as printer protocols, etc.) will not route across the one-way data link. An exemplary configuration enforcing such non-routable point to point communications with a true IP protocol break can be implemented in the one-way file transfer system 200 of FIG. 2. The TCP-based file transfer system 200 may be configured to prohibit transmission of IP information across the one-way data link 207. When the TCP server proxy 205 receives a file from the TCP file client 202, it removes the IP information normally carried in the file data packet headers under the TCP/IP protocol and replaces it with pre-assigned point-to-point channel numbers, so that no IP information is sent across the one-way data link 207. Instead, predetermined IP routes may be defined at the time of the configuration of the system 200 in the form of channel mapping tables residing in the TCP server proxy 205 associated with the send node 204 and the TCP client proxy 210 associated with the receive node 208. The send node 204 then sends the files or data packets with the pre-assigned channel numbers to the receive node 208 through its interface 206 across the one-way data link 207, which are received by the receive node 208 through its interface 209. Upon receipt of the files or data packets, the TCP client proxy 210 then maps the channel numbers from the received files or data packets to the corresponding predetermined IP address of a destination platform 212, to which the files or data packets are forwarded.

SUMMARY OF THE INVENTION

A first embodiment of the present invention is directed to a system for transmitting OPC information from a first network in a first security domain to a second network in a second security domain. A send server has an input coupled to the first network and an output. The send server is configured to forward OPC information received via the input on the output. A one-way data link has an input coupled to the output of the send server and an output. A receive server has an input coupled to the output of the one-way data link and an output coupled to the second network. A first stand-alone server within the first security domain is coupled to the first network and configured to retrieve OPC information via the first network from at least one OPC server in the first security domain and to forward the retrieved OPC information to the send server via the first network. A second stand-alone server within the second security domain coupled to the second network. The receive server is configured to receive the OPC information from the send server via the one-way data link and to forward the received OPC information to the second stand-alone server via the second network. The second stand-alone server is configured to receive the OPC information from the receive server and forward the OPC information to one or more OPC clients in the second security domain. The first stand-alone server is preferably configured to communicate with each of the at least one OPC servers using DCOM protocol. The first stand-alone server is also preferably configured to communicate with the send server using TCP/IP protocol. The second stand-alone server is preferably configured to communicate with each of the at least one OPC clients using DCOM protocol. The second stand-alone server is also preferably configured to communicate with the receive server using TCP/IP protocol.

A second embodiment of the present invention is directed to a system for transmitting OPC information from a first network in a first security domain to a second network in a second security domain. A send server has an input coupled to the first network and an output. The send server is configured to forward OPC information received via the input on the output. A one-way data link has an input coupled to the output of the send server and an output. A receive server has an input coupled to the output of the one-way data link and an output coupled to the second network. A first stand-alone server within the first security domain is coupled to the first network and configured to receive OPC information via the first network from at least one OPC server in the first security domain and to forward the received OPC information to the send server via the first network. Each of the OPC servers is configured to collect predefined OPC information and forward the predefined OPC information to the first stand-alone server using TCP/IP protocol. A second stand-alone server within the second security domain is coupled to the second network. The receive server is configured to receive the OPC information from the send server via the one-way data link and to forward the received OPC information to the second stand-alone server via the second network. The second stand-alone server is configured to receive the OPC information from the receive server and forward the OPC information to one or more OPC clients in the second security domain using TCP/IP protocol. Each of the one or more OPC clients in the second security domain is configured to receive the OPC information in TCP/IP protocol.

A third embodiment of the present invention is directed to a system for transmitting OPC information from a first network in a first security domain to a second network in a second security domain. A first server has an input coupled to the first network and an output. The first server is configured to retrieve OPC information via the first network from a at least one OPC server in the first security domain and to forward the retrieved OPC information on the output. A one-way data link has an input coupled to the output of the first server and an output. A second server has an input coupled to the output of the one-way data link and an output coupled to the second network. The second server is configured to receive the OPC information from the first server via the one-way data link and to forward the received OPC information to one or more OPC clients in the second security domain via the second network. The OPC information received by the first server via the first network is preferably received using TCP/IP protocol. The OPC information forwarded by the second server to one or more OPC clients in the second security domain via the second network is preferably forwarded using TCP/IP protocol.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF THE PREFERRED EMBODIMENTS

In the present disclosure, like reference numbers refer to like elements throughout the drawings, which illustrate various exemplary embodiments of the present invention.

Figure 3:
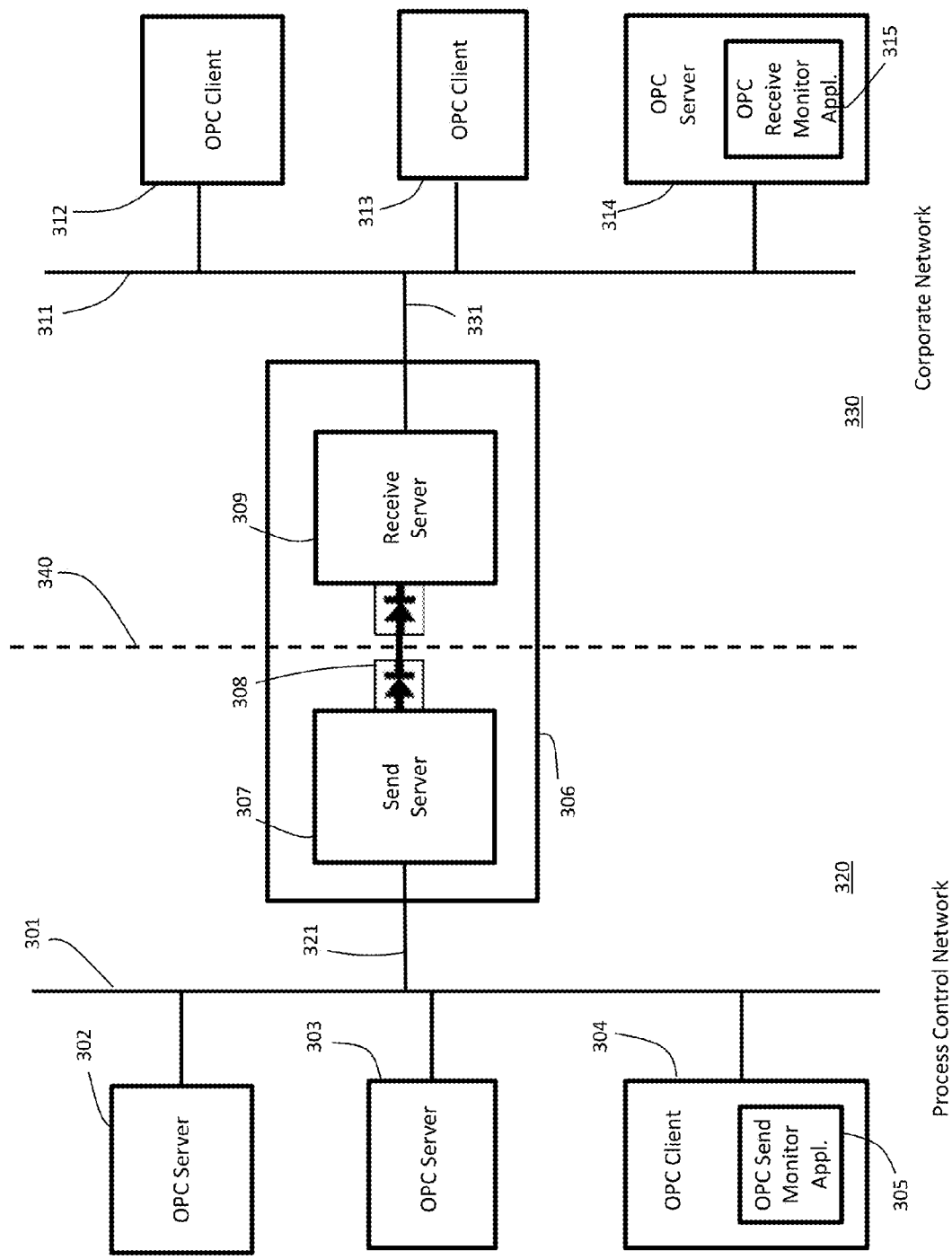
FIG. 3 is a block diagram of a data transfer system embodying features of one embodiment of the present invention.

Referring now to the drawings and in particular to FIG. 3, a first embodiment is shown for transferring OPC information from a process control network 301 in a highly secure domain 320 (i.e., the area to the left of dotted line 340 in FIG. 3) to a corporate network 311 located within a less secure domain 330 (i.e., the area to the right of dotted line 340 in FIG. 3). A number of networked OPC servers 302, 303 are shown coupled to network 301. Two OPC servers are shown in FIG. 3, but this number is completely arbitrary and is dependent on the particular application. The present embodiments may be used in an application having one or more OPC servers. An OPC server is a source of OPC information and is a software application running on a particular Microsoft Windows®-based platform. An OPC client is a software application running on particular Microsoft Windows®-based platform that can access OPC information from each available OPC server. An OPC client 304 is coupled to the process control network 304. OPC client 304 is, in this embodiment, a computer configured to run OPC send monitor application 305, discussed below.

Two OPC clients 312, 313 are shown connected to the corporate network 311 in FIG. 3, but this number is completely arbitrary and is dependent on the particular application. An OPC server 314 is also shown coupled to the corporate network 311. OPC server 314 is, in this embodiment, a computer operating under Microsoft Windows® and configured to run OPC receive monitor application 315.

Figure 1:
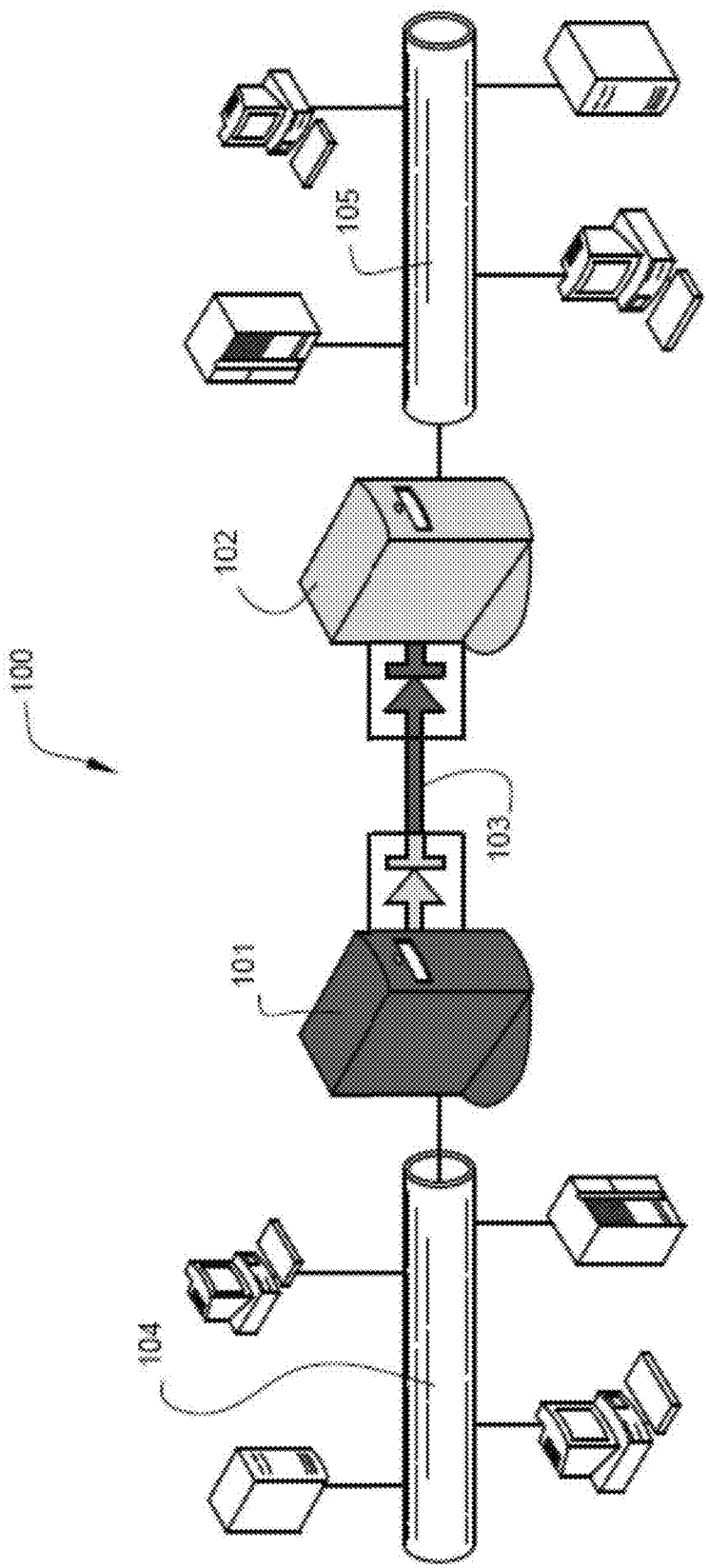
FIG. 1 schematically illustrates an example of a secure one-way data transfer system using a one-way data link.
Figure 2:
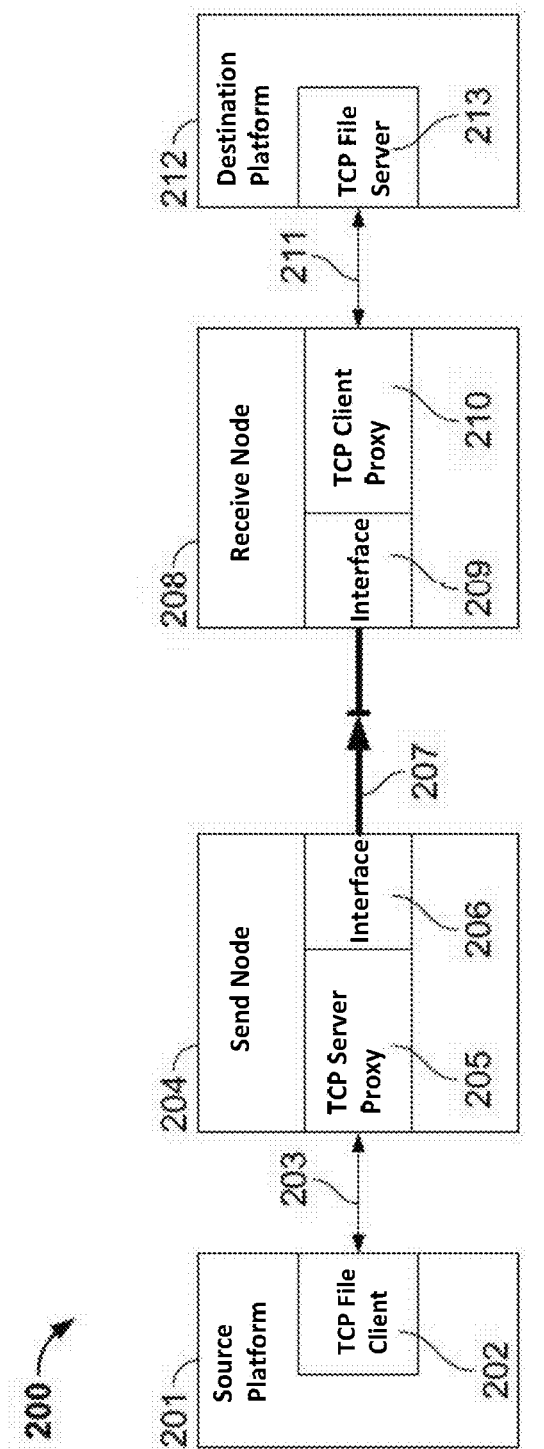
FIG. 2 is a functional block diagram that schematically illustrates TCP-based file or data packet transfer across a one-way data link.

As one of ordinary skill in the art will readily recognize, a direct two-way connection between process control network 301 and corporate network 311 can result in significant security risks, even when a firewall is used between such networks. Furthermore, DCOM may prevent information from being transferred through such firewall. Therefore, in the present embodiments, a TCP-based one-way transfer system 306 is provided which includes an input 321 coupled to process control network 301 and an output 331 coupled to corporate network 311. In particular, one-way transfer system 306 includes a send server 307 coupled to the process control network 301 in the highly secure domain 320 via a network connection and which also is coupled to the input of one-way transfer device 308 (a one-way data link and preferably using a DualDiode device from Owl Computing Technologies, Inc.). A receive server 309 is coupled to the output of the one-way transfer device 308 and also has a network connection that is coupled to the corporate network 311 located within the less secure domain 330. One-way transfer system 306 works in a manner similar to the systems shown in FIGS. 1 and 2 in that information (e.g., data) can be transferred from the send server 307 to the receive server 309 but the physical structure of one-way transfer system 306 prevents any information or signals of any kind whatsoever from being transferred from the receive server 309 to the send server 307. The OPC send monitor application 305 and the OPC receive monitor application 315 communicate with the send server 307 and the receive server 309, respectively, over the respective associated networks 301, 311 using conventional communications protocols, e.g., TCP/IP.

The system disclosed in FIG. 3 relies upon two applications to move information across the one-way transfer system 306, including OPC send monitor application 305 and OPC receive monitor application 315. In overview, the OPC send monitor application 305 is user-configured to read OPC information from OPC servers 302, 303 and forward such information to the one-way transfer system 306 while the OPC receive monitor application 315 is user-configured to receive the OPC information from the one-way transfer system 306 and forward such OPC information to OPC client 312 or OPC client 313 (the particular destination is based on user-settings). Upon startup or under user control, the OPC send monitor application 305 first scans network 301 to identify all available OPC servers. Once all servers are identified, a user may select, using a graphical user interface, points for transfer across the one-way transfer system 306 by sequentially selecting each desired OPC server and some or all of the points available therefrom. OPC send monitor application 305 communicates over network 301 with OPC servers 302, 303 using normal OPC communications (i.e., using DCOM) and communicates with send server 307 via TCP/IP protocol. Likewise OPC receive monitor application 315 communicates over network 311 with OPC clients 312, 313 using normal OPC communications (i.e., using DCOM) and communicates with receive server 309 via TCP/IP protocol.

In operation, OPC send monitor application 305 collects the OPC information (based on user-settings), and forwards such information to send server 307. Send server 307 pushes such information across one-way transfer device 308 for receipt by receive server 309. Receive server 309 forwards all the received information to OPC receive monitor application 315, which, in turn, routes such information to the appropriate OPC client 312 or 313. This embodiment provides a highly secure way to transfer OPC information from a highly secure area to a less secure area, since one-way transfer system 306 physically prevents any information or signals from moving into the highly secure area.

Figure 4:
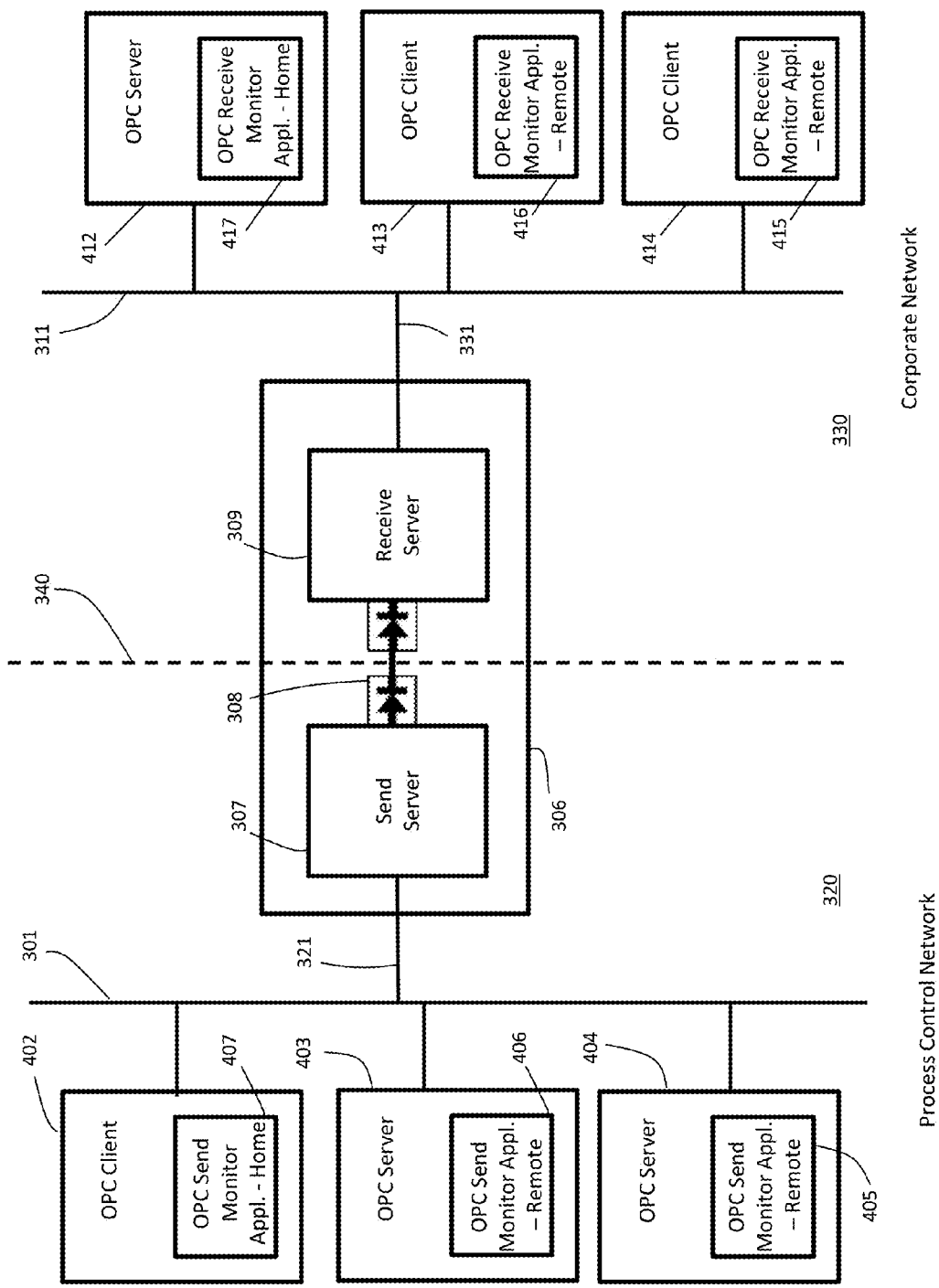
FIG. 4 is a block diagram of a data transfer system embodying features of a second embodiment of the present invention.

As generally known, difficulties can arise in systems using DCOM. Referring now to FIG. 4, a first alternative embodiment is shown which does not rely upon DCOM for OPC information transfer. An OPC client 402 and two OPC servers 403, 404 are coupled to process control network 301 and an OPC server 412 and two OPC clients 413, 414 are coupled to corporate network 311. Communications between OPC servers 403, 404 and OPC client 403 and between OPC server 412 and OPC clients 413, 414 are not based, in this embodiment, on standard DCOM-based OPC communications. Instead, each OPC server 403, 404 is configured to run a respective OPC send monitor application—remote 405, 406, while OPC client 402 is configured to run an OPC send monitor application—home 407. Similarly, OPC clients 413, 414 are configured to run a respective OPC receive monitor application—remote 416, 415, while OPC server 412 is configured to run an OPC receive monitor application—home 417. For the most part, the embodiment shown in FIG. 4 operates in the same way as the embodiment of FIG. 3, except with respect to how OPC information is communicated via respective network 301, 311. A user configures the OPC client 402 (and associated OPC send monitor application—home 407) to collected OPC information (points) from the OPC servers selected from the set of available OPC servers (e.g., OPC servers 402, 404 in FIG. 4). During this configuration, information about the selected points for a particular OPC server is provided to the OPC send monitor application—remote running on that OPC server. In operation, each OPC send monitor application—remote 406, 407 obtains and forwards the OPC information for the selected points from the associated OPC server 403, 404 to OPC send monitor application—home 407, which, in turn, forwards such information to send server 307 (as in the FIG. 3 embodiment). Similarly, based on user-settings, OPC receive monitor application—home 415 receives OPC information (points) from receive server 309 (as with the FIG. 3 embodiment) and forwards such OPC information to OPC receive monitor applications 417 and/or 416, based on configuration information. Finally, each OPC receive monitor application 417, 416 forwards the received OPC information to the appropriate OPC client application.

Communications between OPC send monitor application—home 407 and OPC send monitor application—remote 405, 406 and between OPC receive monitor application—home 417 and OPC receive monitor application—remote 415, 416 is done via normal TCP/IP connection without using DCOM (commonly referred to as "tunneling"). This embodiment eliminates any problems related to the use of DCOM, which has been revised often by Microsoft® and is known to be somewhat unstable in certain uses. This embodiment provides a highly-secure one-way transfer solution for OPC information and has the added benefit of eliminating the possibility of DCOM transmission issues.

Figure 5:
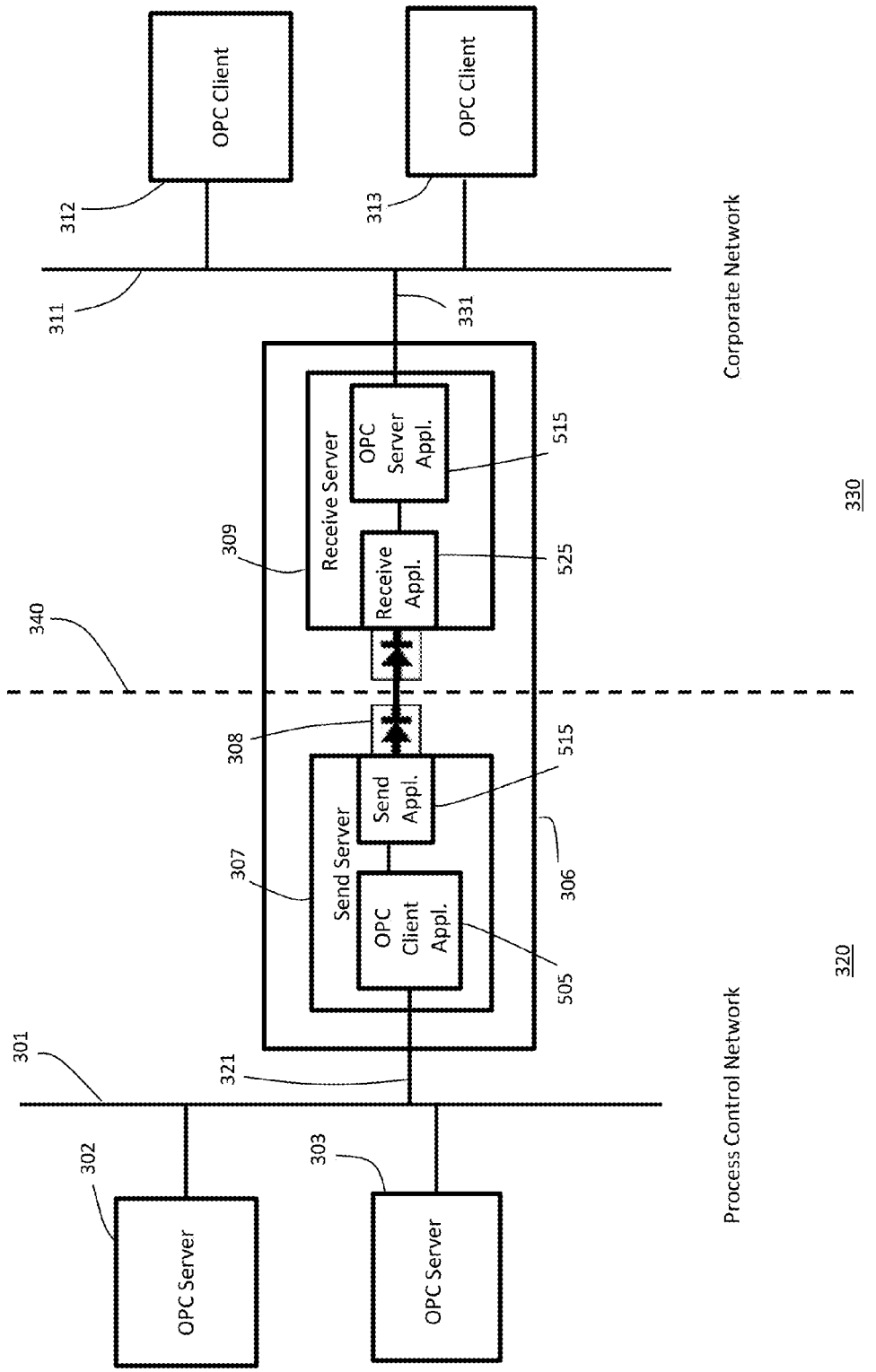
FIG. 5 is a diagram of the contents of a data transfer system embodying features of a third embodiment of the present invention.

Referring now to FIG. 5, a second alternative embodiment is shown for use in an OPC UA environment. OPC UA is an object-oriented solution which does not use DCOM or any similar constructs. Thus, communications between an OPC server 302, 303 and a client application 505 or between an OPC client 312, 313 and a OPC server application 515 can be based on conventional TCP/IP protocol. Thus, send server 307 is configured in this application to run OPC client application 505 and receive server 309 is configured to run OPC server application 515. OPC client application 505 is configured to collect OPC information (points) from the available OPC servers, and to forward the collected OPC information to a send application 515 running on send server 307 for transfer across the one-way transfer device 308 to the receive server 309. A receive application 525 running on receive server 309 receives the OPC information from the one-way transfer device 308 and forwards such information to the OPC server application 515 also running on receive server 309.

OPC server application 515 is preconfigured to forward the OPC information to the appropriate OPC client via network 311 also using conventional TCP/IP protocol. This embodiment provides a simplified implementation but requires OPC servers (on the process side) and OPC clients (on the corporate side) that are designed for OPC UA.

Although the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A system for transmitting OPC information from a first network in a first security domain to a second network in a second security domain, comprising:
    a send server having an input coupled to the first network and an output, the send server configured to forward OPC information received via the input on the output;
    a one-way data link having an input coupled to the output of the send server and an output, the one-way data link configured to transfer data only from the input to the output and to prevent any data or signal from passing from the output to the input;
    a receive server having an input coupled to the output of the one-way data link and an output coupled to the second network;
    a first stand-alone server within the first security domain coupled to the first network and configured to retrieve OPC information via the first network from at least one OPC server in the first security domain and to forward the retrieved OPC information to the send server via the first network;
    a second stand-alone server within the second security domain coupled to the second network;
    wherein the receive server is configured to receive the OPC information from the send server via the one-way data link and to forward the received OPC information to the second stand-alone server via the second network;
    wherein the second stand-alone server is configured to receive the OPC information from the receive server and forward the OPC information to one or more OPC clients in the second security domain; and
    wherein the send server is coupled to the receive server only via the one-way data link.

2. The system of claim 1, wherein the first stand-alone server is configured to communicate with each of the at least one OPC servers using Distributed Component Object Mode (DCOM) protocol.

3. The system of claim 1, wherein the first stand-alone server is configured to communicate with the send server using Transmission Control Protocol/Internet Protocol (TCP/IP) protocol.

4. The system of claim 1, wherein the first stand-alone server is configured to communicate with each of the at least one OPC servers using Distributed Component Object Mode (DCOM) protocol and to communicate with the send server using Transmission Control Protocol/Internet Protocol (TCP/IP) protocol.

5. The system of claim 1, wherein the second stand-alone server is configured to communicate with each of the at least one OPC clients using Distributed Component Object Mode (DCOM) protocol.

6. The system of claim 1, wherein the second stand-alone server is configured to communicate with the receive server using Transmission Control Protocol/Internet Protocol (TCP/IP) protocol.

7. The system of claim 1, wherein the second stand-alone server is configured to communicate with each of the at least one OPC clients using Distributed Component Object Mode (DCOM) protocol and to communicate with the receive server using Transmission Control Protocol/Internet Protocol (TCP/IP) protocol.

8. A system for transmitting OPC information from a first network in a first security domain to a second network in a second security domain, comprising:
  a send server having an input coupled to the first network and an output, the send server configured to forward OPC information received via the input on the output;
  a one-way data link having an input coupled to the output of the send server and an output, the one-way data link configured to transfer data only from the input to the output and to prevent any data or signal from passing from the output to the input;
  a receive server having an input coupled to the output of the one-way data link and an output coupled to the second network;
  a first stand-alone server within the first security domain coupled to the first network and configured to receive OPC information via the first network from at least one OPC server in the first security domain and to forward the received OPC information to the send server via the first network, wherein each of the OPC servers is configured to collect predefined OPC information and forward the predefined OPC information to the first stand-alone server using Transmission Control Protocol/Internet Protocol (TCP/IP) protocol;
  a second stand-alone server within the second security domain coupled to the second network;
  wherein the receive server is configured to receive the OPC information from the send server via the one-way data link and to forward the received OPC information to the second stand-alone server via the second network;
  wherein the second stand-alone server is configured to receive the OPC information from the receive server and forward the OPC information to one or more OPC clients in the second security domain using TCP/IP protocol, and wherein each of the one or more OPC clients in the second security domain is configured to receive the OPC information in TCP/IP protocol; and
  wherein the send server is coupled to the receive server only via the one-way data link.

9. A system for transmitting OPC information from a first network in a first security domain to a second network in a second security domain, comprising:
  a first server having an input coupled to the first network and an output, the first server configured to retrieve OPC information via the first network from a at least one OPC server in the first security domain and to forward the retrieved OPC information on the output;
  a one-way data link having an input coupled to the output of the first server and an output, the one-way data link configured to transfer data only from the input to the output and to prevent any data or signal from passim from the output to the input;
  a second server having an input coupled to the output of the one-way data link and an output coupled to the second network, the second server configured to receive the OPC information from the first server via the one-way data link and to forward the received OPC information to one or more OPC clients in the second security domain via the second network; and
  wherein the first server is coupled to the second server only via the one-way data link.

10. The system of claim 9, wherein the OPC information received by the first server via the first network is received using Transmission Control Protocol/Internet Protocol (TCP/IP) protocol.

11. The system of claim 9, wherein the OPC information forwarded by the second server to one or more OPC clients in the second security domain via the second network is forwarded using Transmission Control Protocol/Internet Protocol (TCP/IP) protocol.

12. The system of claim 9, wherein the OPC information received by the first server via the first network is received using Transmission Control Protocol/Internet Protocol (TCP/IP) protocol, and wherein the OPC information forwarded by the second server to one or more OPC clients in the second security domain via the second network is forwarded using TCP/IP protocol.

* * * * *